US012556130B2

(12) United States Patent
Quintana (10) Patent No.: US 12,556,130 B2
(45) Date of Patent: Feb. 17, 2026

(54) SINGLE-AXIS PHOTOVOLTAIC TRACKING SYSTEM

(71) Applicant: Benjamin Quintana, San Antonio, TX (US)

(72) Inventor: Benjamin Quintana, San Antonio, TX (US)

(*) Notice: Subject to any disclaimer, the term of this patent is extended or adjusted under 35 U.S.C. 154(b) by 80 days.

(21) Appl. No.: 18/263,607

(22) PCT Filed: Nov. 15, 2022

(86) PCT No.: PCT/US2022/050000
§ 371 (c)(1),
(2) Date: Jul. 31, 2023

(87) PCT Pub. No.: WO2023/091432
PCT Pub. Date: May 25, 2023

(65) Prior Publication Data
US 2024/0079991 A1 Mar. 7, 2024

Related U.S. Application Data

(60) Provisional application No. 63/279,938, filed on Nov. 16, 2021.

(51) Int. Cl.
*H02S 20/32* (2014.01)
(52) U.S. Cl.
CPC .................. *H02S 20/32* (2014.12)
(58) Field of Classification Search
CPC ....................................... H02S 20/32
See application file for complete search history.

(56) References Cited

U.S. PATENT DOCUMENTS

| 9,640,965 | B1* | 5/2017 | Long | H02G 15/007 |
| 10,326,401 | B2 | 6/2019 | Wu | |
| 2013/0039610 | A1* | 2/2013 | Schneider | F24S 25/70 |
| | | | | 384/428 |
| 2021/0273602 | A1 | 9/2021 | Gu et al. | |

FOREIGN PATENT DOCUMENTS

| CN | 111351242 A | * | 6/2020 | |
| WO | WO-2018115942 A1 | * | 6/2018 | H02S 40/12 |

OTHER PUBLICATIONS

Liu, CN 111351242 A, Machine Translation, 2020 (Year: 2020).*

* cited by examiner

*Primary Examiner* — Devina Pillay
(74) *Attorney, Agent, or Firm* — Cotman IP Law group (57) ABSTRACT

The present invention involves a single-axis solar tracker and its drive system having a balanced crank-throw design for mounting photovoltaic panels, and in turn eliminating the need for an underlying traditional mounting bracket, mounting pivot, and/or torque tube. Each photovoltaic panel row rotates about one common rotation axis, while photovoltaic panels are segmented into discrete subsets mounted to simple fixed support bars extended away from the row's central rotation axis in a horizontally opposed crank-throw configuration. The drive mechanism has at least one rotary actuator within or at one or more ends of the row, such as an enclosed stepper slew motor, whose rotation axis defines the common rotational axis of the row.

11 Claims, 10 Drawing Sheets

SINGLE-AXIS PHOTOVOLTAIC TRACKING SYSTEM

CROSS REFERENCES TO RELATED APPLICATIONS

This application claims the benefit of U.S. Provisional Patent Application No. 63/279,938, filed Nov. 16, 2021, entitled "IMPROVED SINGLE-AXIS PHOTOVOLTAIC TRACKING DEVICE AND SYSTEM", which is incorporated herein by reference in its entirety.

FIELD OF THE INVENTION

Embodiments of the invention generally relate to photovoltaic systems with solar trackers. More specifically, one or more embodiments of the invention relate to an improved single-axis photovoltaic tracking system. For example, one or more embodiments of the invention are directed to improvements in the efficiency, efficacy, and reliability in the tracker motor assembly for rocking or rotating, a group or array of photovoltaic panels aligned in rows.

BACKGROUND

There is a need in the art for a solar panel system that is robust and able to withstand external force that can cause the solar panel system to be unreliable.

SUMMARY OF THE INVENTION

An improved single-axis photovoltaic tracking system will now be described in accordance with one or more embodiments of the invention. The following exemplary description numerous specific details are set forth to provide a more thorough understanding of embodiments of the invention. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced items.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration. Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Provided herein is an improved single-axis photovoltaic tracking system comprising: a) a plurality of photovoltaic panels b) a central axis c) a central longitudinal axis d) a controller, wherein the controller rotates the photovoltaic panels about the central longitudinal axis e) a vertical support pier, wherein the vertical support pier anchors the controller, wherein the vertical support pier is connected to the central axis f) a first mounting arm, wherein the first mounting arm is fixed, wherein the first mounting arm extends outward from the central axis, wherein the center of the central axis is a point of rotation g) a second mounting arm, wherein the second mounting arm is fixed, wherein the second mounting arm is configured directly opposed to the first mounting arm, wherein the second mounting arm extends outward from the central axis, wherein the center of the central axis is a point of rotation h) a first main journal arm, wherein the first main journal arm is fixed, wherein first main journal arm extends outward from the central axis, of the controller i) a second main journal arm, wherein the second main journal arm is fixed, wherein the second main journal arm is configured as directly opposed to the first main journal arm, wherein second main journal arm extends outward from the central axis of the controller j) a fixed mounting bar, wherein the fixed mounting bar is connected between the first mounting arm and the first main journal arm, wherein the fixed mounting bar does not rotate, wherein the fixed mounting bar secures mounting of the photovoltaic panel; wherein the center of the central axis is a point of rotation, wherein the first mounting arm is connected to a fixed mounting arm, wherein the second mounting arm is connected to the fixed mounting arm k) a plurality of complimentary photovoltaic panels, wherein in the complimentary photovoltaic panels are attached to the fixed mounting arm and l) a plurality of complimentary mounting bars, wherein the plurality of complimentary photovoltaic panels are mounted to the complimentary mounting bars. The complimentary mounting bars of l), wherein the plurality of complimentary mounting bars extend from an opposite end of the second mounting arm. The central axis of b) further comprising: a) an eastern side and b) a western side. The complimentary mounting bars of l), wherein weight of the plurality of complimentary photovoltaic panels counterbalance weight of the plurality of photovoltaic panels and the complimentary mounting bars, wherein weight of the photovoltaic panels and the complimentary mounting bars on the western side of the central axis counterbalances the weight of the photovoltaic panels and the complimentary mounting bars on the eastern side of the central axis. In addition, the counterbalancing of l), wherein the counterbalancing of the weight of the photovoltaic panels and complimentary photovoltaic panels and the complimentary mounting bars on the eastern side of the central axis enables the central axis to increase in length, wherein the increased length of the central axis enables the use of more the photovoltaic panels.

In another embodiment provided is a single-axis photovoltaic tracking system comprising: a) a plurality of photovoltaic panels, b) a central axis c) a central longitudinal axis d) an actuator, wherein the actuator rotates the photovoltaic panels about the central longitudinal axis e) a programmable logic controller, wherein the programmable logic controller controls rotations of the actuator f) a vertical support pier, wherein the vertical support pier rotates, wherein the vertical support pier anchors the actuator, wherein the vertical support pier is connected to the central axis g) a first mounting arm, wherein the first mounting arm is fixed, wherein the first mounting arm extends outward from the central axis, wherein the center of the central axis is a point of rotation h) a second mounting arm, wherein the second mounting arm is fixed, wherein the second mounting arm is configured directly opposed to the first mounting arm, wherein the second mounting arm extends outward from the central axis, wherein the center of the central axis is a point of rotation i) a first main journal arm, wherein the first main journal arm is fixed, wherein the first main journal arm extends outward from the central axis, of the actuator j) a second main journal arm, wherein the second main journal arm is fixed, wherein the second main journal arm is configured directly opposed to the first main journal arm, wherein the second main journal arm extends outward from the central axis of the actuator k) a fixed mounting bar, wherein the fixed mounting bar is connected between the first mounting arm and the first main journal arm, wherein the fixed mounting bar does not rotate, wherein the fixed mounting bar secures mounting of the photovoltaic panel, wherein center of the central axis is a point of rotation, wherein the first mounting arm is connected to the fixed mounting arm, wherein the second mounting arm is connected to the fixed mounting arm l) a plurality of complimentary photovoltaic panels, wherein in the complimentary photovoltaic panels are attached to the fixed mounting arm, wherein length of the fixed mounting arm is increased and m) a plurality of complimentary mounting bars, wherein the plurality of complimentary photovoltaic panels are mounted to the plurality of complimentary mounting bars. The complimentary mounting bars of m), wherein the plurality of complimentary mounting bars extend from opposite ends of the second mounting arms and the second main journal arm. The central axis of b) further comprising: a) an eastern side and b) a western side The complimentary mounting bars of m), wherein weight of the plurality of complimentary photovoltaic panels counterbalance weight of the plurality of photovoltaic panels and the complimentary mounting bars, wherein weight of the plurality of photovoltaic panels and the complimentary mounting bars on the western side of the central axis counterbalances the weight of the plurality of photovoltaic panels and the complimentary mounting bars on the eastern side of the central axis. The counterbalancing of m), wherein the counterbalancing of the weight of the photovoltaic panels and the complimentary photovoltaic panels and the complimentary mounting bars on the eastern side of the central axis enables the central axis to increase in length, wherein the increased length of the central axis enables the use of more the photovoltaic panels.

In another embodiment provided is a single-axis photovoltaic tracking system comprising: a) a plurality of photovoltaic panels, wherein number of the photovoltaic panels can vary b) a central axis c) a central longitudinal axis d) a stepper slew motor, wherein the stepper slew motor is attached to the motor, wherein the stepper slew motor rotates the photovoltaic panels about the central longitudinal axis e) a motor, wherein the motor drives the stepper slew motor f) a rotating main journal, wherein the rotating main journal is attached to the stepper slew motor g) a vertical motor support pier, wherein the vertical motor support pier is attached to an earth ground, wherein the vertical motor support pier supports the motor h) a programmable logic controller controls the rotations of the stepper slew motor i) a vertical support pier, wherein the vertical support pier rotates, wherein the vertical support pier anchors the rotating main journal, wherein the vertical support pier is connected to the central axis; a first mounting arm, wherein the first mounting arm is fixed, wherein the first mounting arm is configured as directly opposed to each other, wherein the first mounting arm extends outward from the central axis, wherein center of the central axis is a point of rotation j) a second mounting arm, wherein the second mounting arm is fixed, wherein the second mounting arm is configured as directly opposed to each other, wherein the second mounting arm extends outward from the central axis, wherein center of the central axis is a point of rotation k) a first main journal arm, wherein the first main journal arm is fixed, wherein the first main journal arm extends outward from the central axis, of the rotating main journal l) a second main journal arm, wherein the second main journal arm is fixed, wherein the second main journal arm is configured as directly opposed to the first main journal arm, wherein the second main journal arm extends outward from the central axis of the rotating main journal; a fixed mounting bar, wherein the fixed mounting bar is connected between the first mounting arm and the first main journal arm, wherein the fixed mounting bar does not rotate, wherein the fixed mounting bar secures mounting of the photovoltaic panel, wherein the center of the central axis is a point of rotation, wherein the first mounting arm is connected to the fixed mounting arm, wherein the second mounting arm is connected to the fixed mounting arm m) a plurality of complimentary photovoltaic panels and n) a plurality of complimentary mounting bars, wherein the plurality of complimentary photovoltaic panels are mounted to the plurality of complimentary mounting bars. The central axis of b) further comprising: a) an eastern side and b) a western side, wherein an equal number of the complimentary photovoltaic panels are attached. The complimentary mounting bars of n), wherein weight of the complimentary photovoltaic panels counterbalance weight of the photovoltaic panels and the complimentary mounting bars, wherein weight of the photovoltaic panels and the complimentary mounting bars on the western side of the central axis counterbalances the weight of the photovoltaic panels and the complimentary mounting bars on the eastern side of the central axis. The counterbalancing of claim n), wherein the counterbalancing of weight of the photovoltaic panels and the mounting bars on the eastern side of the central axis enables the central axis to increase in length, wherein the increased length of the central axis enables the use of more the photovoltaic panels.

REFERENCES

The description of the figures provided herein contain references to each depicted component. A list of these components described in the context of each figure is provided below for easy reference.
  100 Photovoltaic Panels
  102 Motor
  104 Vertical Motor Support Pier
  106 Central Axis
  108 Rotating Main Journal
  110 Central Longitudinal Axis
  112 Vertical Support Pier
  114 Stepper Slew Motor
  116 First Mounting Arm
  118 Second Mounting Arm
  120 First Main Journal Arm
  122 Second Main Journal Arm
  124 Fixed Mounting Bar
  126 Complimentary Photovoltaic Panels
  128 Complimentary Mounting Bars
  130 Controller
  200 Actuator
  202 Programmable Logic Controller
  900 Row

DESCRIPTION OF THE DRAWINGS

The above and other aspects, features and advantages of the invention will be more apparent from the following more particular description thereof, presented in conjunction with the following drawings wherein.

DETAILED DESCRIPTION

Figure 1:
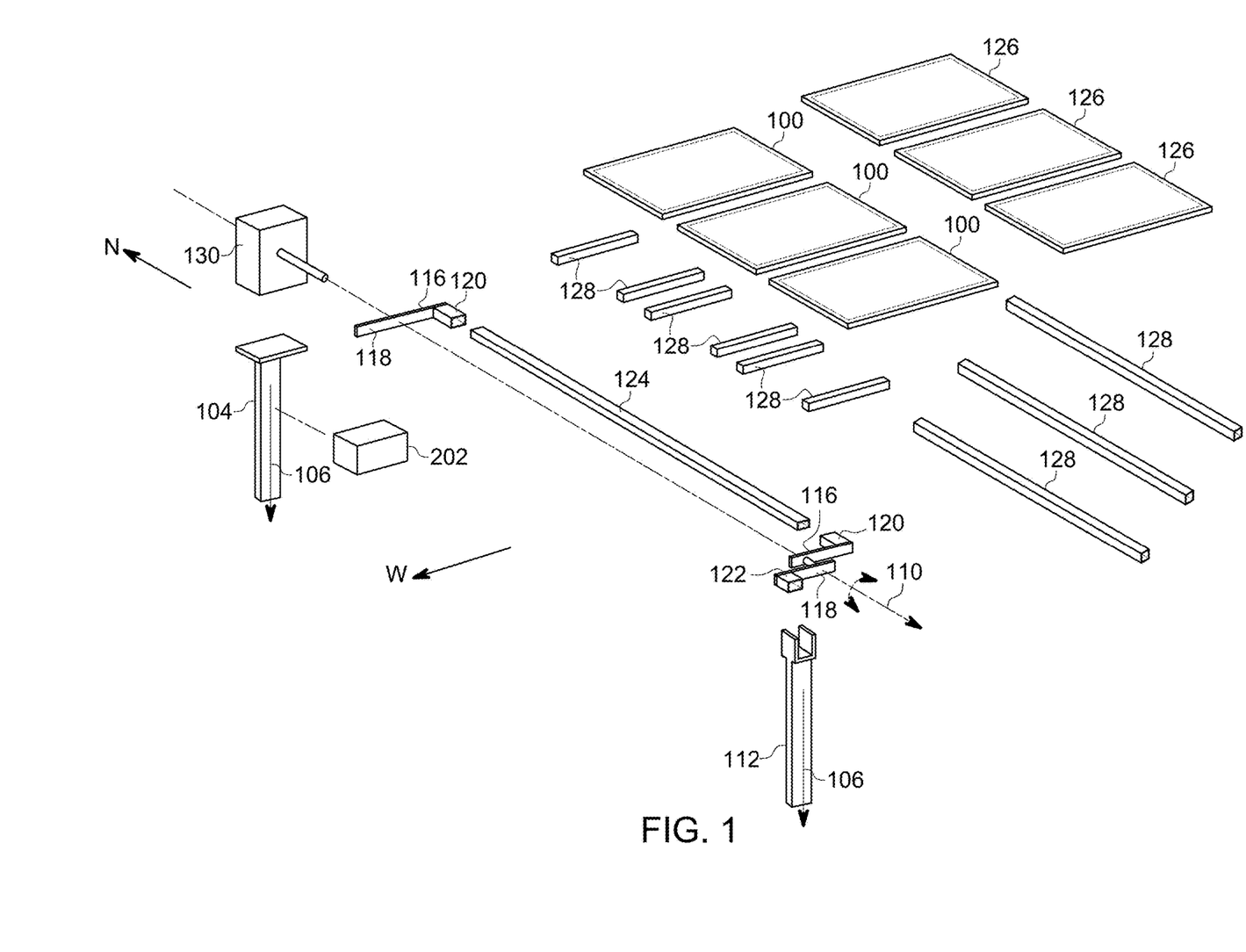
FIG. 1 is an exploded perspective view of one embodiment of an improved single-axis photovoltaic tracker.

FIG. 1 illustrates an improved single-axis photovoltaic tracking system as it is configured in accordance with one or more embodiments of the invention. In this illustrated example, the system comprises of a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), a fixed mounting bar (124), a plurality of complimentary photovoltaic panels (126), a plurality of complimentary mounting bars (128), and a controller (130).

In one or more embodiments of the invention the exploded view shows 3 photovoltaic panels (100) utilized. However, the number of photovoltaic panels is not limited to 3 and can be either lower or higher than 3. In order to create accurate rotation in the system, a controller (130) or an equivalent structure that performs the intended rotating function, is implemented to achieve precise rotational movements of the system about a central longitudinal axis (110). Also shown in FIG. 1 is the first mounting arm (116), and the second mounting arm (118) or equivalent structures that perform the intended purpose. Each of these arms extend laterally or outwardly from the central axis (106) from the center of the controller's (130) point of rotation. The controller (130) could include but not limited to a motor, or an actuator or a switch or any equivalent structure that performs rotation of the photovoltaic panels (100). Also included are the first main journal arm (120), and second main journal arm (122) or equivalent structures that perform the intended purpose. These the arms are fixed and directly opposed to the first and second main journal arms and extend laterally or outwardly from the central axis (106) in the same configuration as first mounting arms (116) and second mounting arms (118) with respect to the central longitudinal axis (110). Also shown in FIG. 1 is a fixed mounting bar (124) or an equivalent structure that provides the same intended purpose. The fixed mounting bar (124) is connected between the first mounting arm (116) and the first main journal arm (120). The fixed mounting bar (124) does not rotate and that allows for the secure mounting of photovoltaic panels (100) and complimentary photovoltaic panels (126). In this embodiment the addition of complimentary photovoltaic panels (126) mounted to complimentary mounting bars (128), extend away from the photovoltaic panels (100) from the opposite ends of the second mounting arm (118) and second main journal arm (122). The weight of the complimentary mounting bars (128) and photovoltaic panels (100) on the western-side of the central axis (106) offset the weight of the photovoltaic panels (100) and the fixed mounting bar (124) on the easternly-side of the central axis (106). This alternation is enabled by the use of the first mounting arm (116), second mounting arm (118), first main journal arm (120), and second main journal arm (122) to project the photovoltaic panels (100) laterally outward from a central axis (106). This in turn results in a counterbalance of the complimentary photovoltaic panels (126) along the length of single axis system. The laterally opposed masses extend the length of the central longitudinal axis (110) of rotation and allow for laterally opposed forces, which sum to zero. A sum of zero force means that if there is an external force such as wind, the counter balancing characteristic created by the placement of complimentary photovoltaic panels (126) will result in a net force of zero and the single-axis photovoltaic tracking system remains at equilibrium. If there is no counter balancing and no equilibrium, external forces such as wind create vibrations throughout the system which will lead to reliability issues withing the system that could turn catastrophic if not mitigated.

Figure 2:
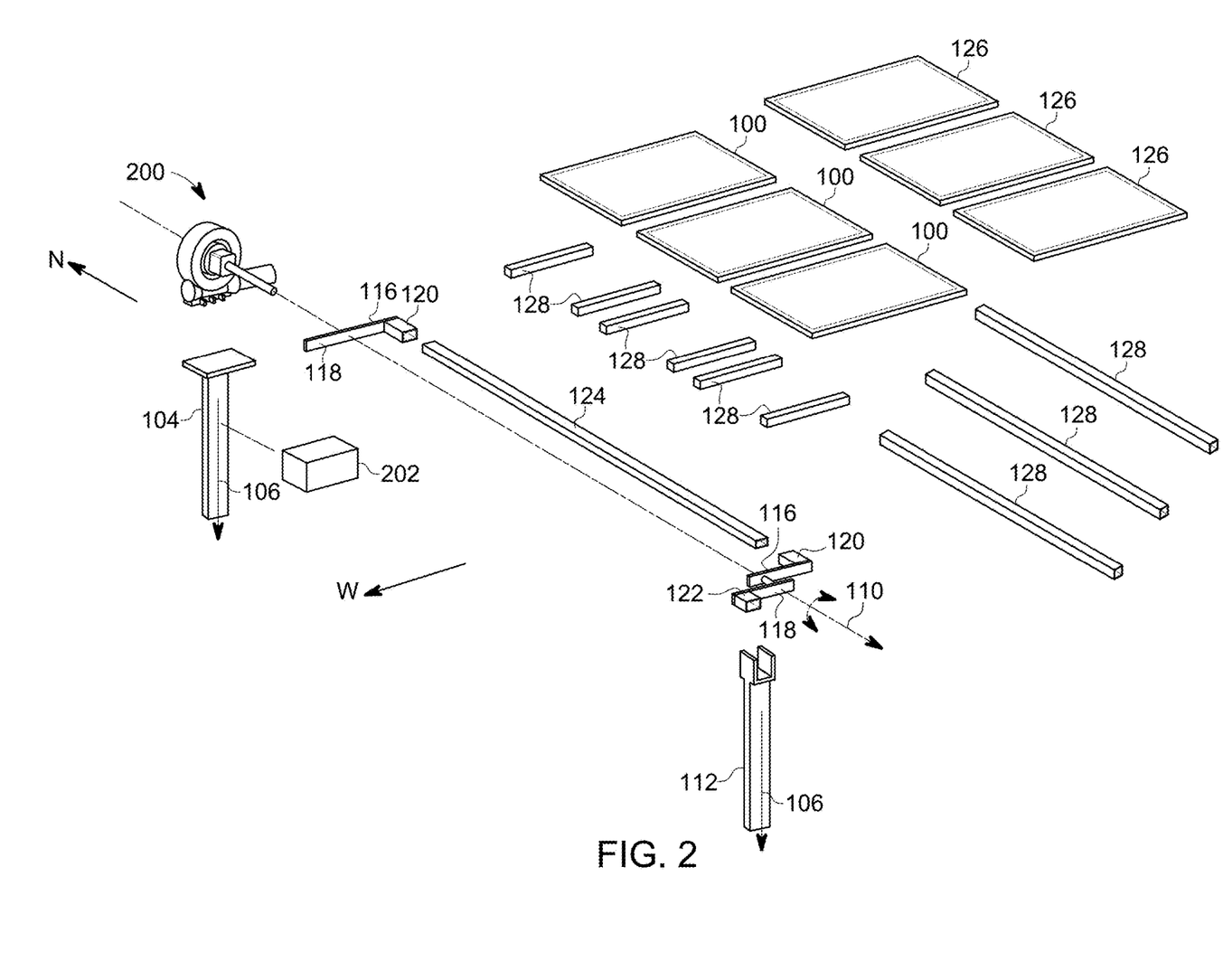
FIG. 2 is an exploded perspective view of another embodiment of an exploded view of an improved single-axis photovoltaic tracker with a programmable logic controller and actuator.

FIG. 2 illustrates an improved single-axis photovoltaic tracking system as it is configured in accordance with one or more embodiments of the invention. In this illustrated example, the system comprises of a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), and a fixed mounting bar (124), a plurality of complimentary photovoltaic panels (126), and a plurality of complimentary mounting bars (128), an actuator (200), a programmable logic controller (202).

In one or more embodiments of the invention the exploded view shows 3 photovoltaic panels (100) utilized. The number of photovoltaic panels is not limited to 3 and can be either lower or higher than 3. In order create accurate rotation in the system, an actuator (200) or an equivalent structure that performs the intended rotating function, is implemented to achieve precise rotational movements of the system about a central longitudinal axis (110). Some examples of possible actuators (200) that could be used are linear actuators, hydraulic piston actuators, rotary actuators, hydraulic actuators, pneumatic actuators, electric actuators, thermal and magnetic actuators, mechanical actuators, supercoiled polymer actuators or any equivalent structures that perform the same intended purpose. The actuator (200) itself is a component of a system that is responsible for moving or rotating and controlling a mechanism or system. Here the actuator (200) performs the function of creating rotation of the photovoltaic panels (100). The actuator (200) is controlled by a programmable logic controller (202) which is an industrial computer control system that monitors the state of an input stimulus such as a user interface and makes decisions based upon a custom program to control the state of actuator (200). The programmable logic controller (202) is programmed with National Renewable Energy Laboratory solar position algorithm or any other equivalent algorithm that performs the intended purpose. The algorithm controls the angle of the actuator (200) to rotate the photovoltaic panels (100) and the complimentary photovoltaic panels (126) towards the sun.

Also shown in FIG. 2 is the first mounting arm (116), and the second mounting arm (118) or equivalent structures that perform the intended purpose. Also shown in FIG. 2 is a fixed mounting bar (124) or an equivalent structure that provides the same intended purpose. The fixed mounting bar (124) is connected between the first mounting arm (116) and the first main journal arm (120). The fixed mounting bar (124) does not rotate and that allows for the secure mounting of photovoltaic panels (100). In this embodiment the addition of complimentary photovoltaic panels (126) mounted to complimentary mounting bars (128) extend away from the photovoltaic panels (100) from the opposite ends of the second mounting arm (118) and second main journal arm (122). The weight of the complimentary mounting bars (128) and photovoltaic panels (100) on the western-side of the central axis (106) offset the weight of the photovoltaic panels (100) and the fixed mounting bar (124) on the easternly-side of the central axis (106). This alternation is enabled by the use of the first mounting arm (116), second mounting arm (118), first main journal arm (120), and second main journal arm (122) to project the photovoltaic panels (100) laterally outward from a central axis (106). This in turn results in a counterbalance of the complimentary photovoltaic panels (126) along the length of single axis system. The laterally opposed masses extending the length of the central longitudinal axis (110) of rotation allow for laterally opposed forces, which sum to zero.

Figure 3:
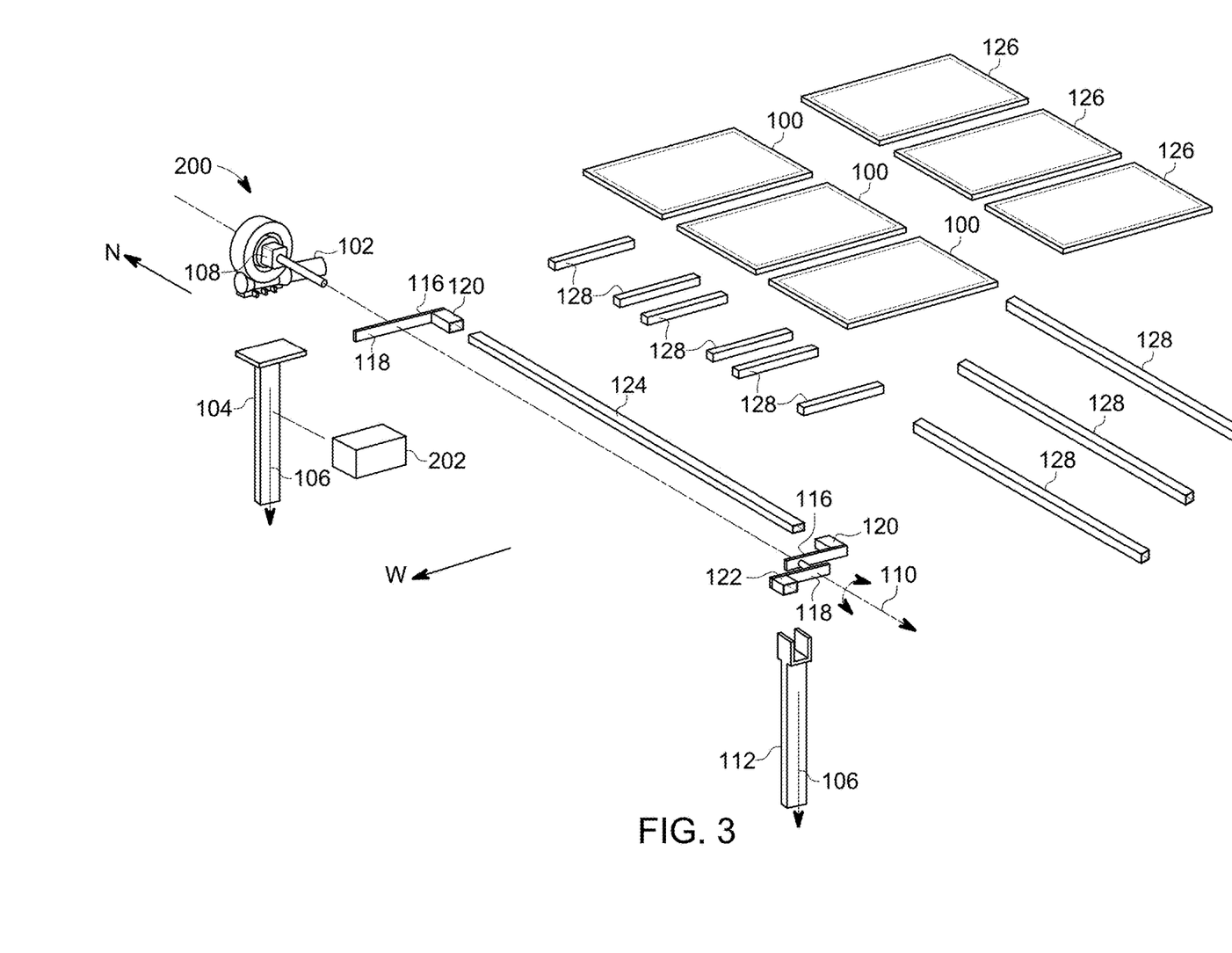
FIG. 3 is an exploded perspective view of another embodiment of an improved single-axis photovoltaic tracker with a motor, an actuator, a stepper slew motor, and a rotating main journal.

FIG. 3 illustrates an improved single-axis photovoltaic tracking system as it is configured in accordance with one or more embodiments of the invention. In this illustrated example, the system comprises a plurality of photovoltaic panels (100), a motor (102), a vertical motor support pier (104), a central axis (106), a rotating main journal (108), a central longitudinal axis (110), a vertical support pier (112), a stepper slew motor (114), a first mounting arm (116), a second mounting arm (118), a first main journal arm (120), a second main journal arm (122), and a fixed mounting bar (124), a plurality of complimentary photovoltaic panels (126), a plurality of complimentary mounting bars (128), an actuator (200) and a programmable logic controller (202).

In one or more embodiments of the invention the exploded view shows 3 photovoltaic panels (100) utilized. Also included but not limited to a vertical motor support pier (104) or an equivalent structure that performs the intended purpose. The vertical motor support pier (104) supports or holds the motor (102) in place. In order create accurate rotation in the system, the motor (102), the rotating main journal (108) and the stepper slew motor (114) work together as a single unit to achieve precise rotational movements of the system about a central longitudinal axis (110). Stepper slew motors (114) also referred to but not limited to as a swing motor or a swing drive motor, provide rotation for the system. The motor (102) is an electrical machine that converts electrical energy into mechanical energy. Motors (102) operate through the interaction between the motor's magnetic field and electric current in a wire winding to generate force in the form of torque applied on the motor's shaft. The motor (102) here drives the stepper slew motor (114) and provides it with energy such that the stepper slew motor (114) can achieve rotation. The motor's (102) functionality is controlled by a programmable logic controller (202), which is programmed with National Renewable Energy Laboratory solar position algorithm or any other equivalent algorithm that performs the intended purpose. The algorithm controls motor (102), stepper slew motor (114) and rotating main journal (108) to rotate the photovoltaic panels (100) and the complimentary photovoltaic panels (126) towards the sun. The motor (102), rotating main journal and the stepper slew motor (114) can be either powered by directed current (DC) or alternating current (AC).

Also shown in FIG. 3 a first mounting arms (116) and second mounting arms (118) or equivalent structures that perform the intended purpose, with fixed and directly first and second fixed and directly opposed motor mounting arms extending laterally or outwardly from the central axis (106) at the center of the stepper slew motor's (114) point of rotation, first and second fixed and directly opposed main journal arms extending laterally or outwardly from the central axis (106) of the main journal (108) in the same configuration as the first motor mounting arm (116) and second motor mounting arm (118) with respect to the central longitudinal axis (110), and a fixed mounting bar (124).

In this embodiment the weight of the complimentary mounting bars (128) and photovoltaic panels (100) on the western-side of the central axis (106) offset the weight of the photovoltaic panels (100) and the fixed mounting bar (124) on the easternly-side of the central axis (106). The alternation between eastern and western, or vice versa, lateral extensions of photovoltaic panels (100) and the fixed mounting arms (124) carries down the entire row (what element is this). This alternation is enabled by the use of the first mounting arm (116), second mounting arm (118), first main journal arm (120), and second main journal arm (122) to project the photovoltaic panels (100) laterally outward from a central axis. This in turn results in a counterbalance of the photovoltaic panels (100) along the length of the photovoltaic panels (100) and complimentary photovoltaic panels (126). The laterally opposed masses extending the length of the central longitudinal axis (110) of rotation allow for laterally opposed forces, which sum to zero.

Figure 4:
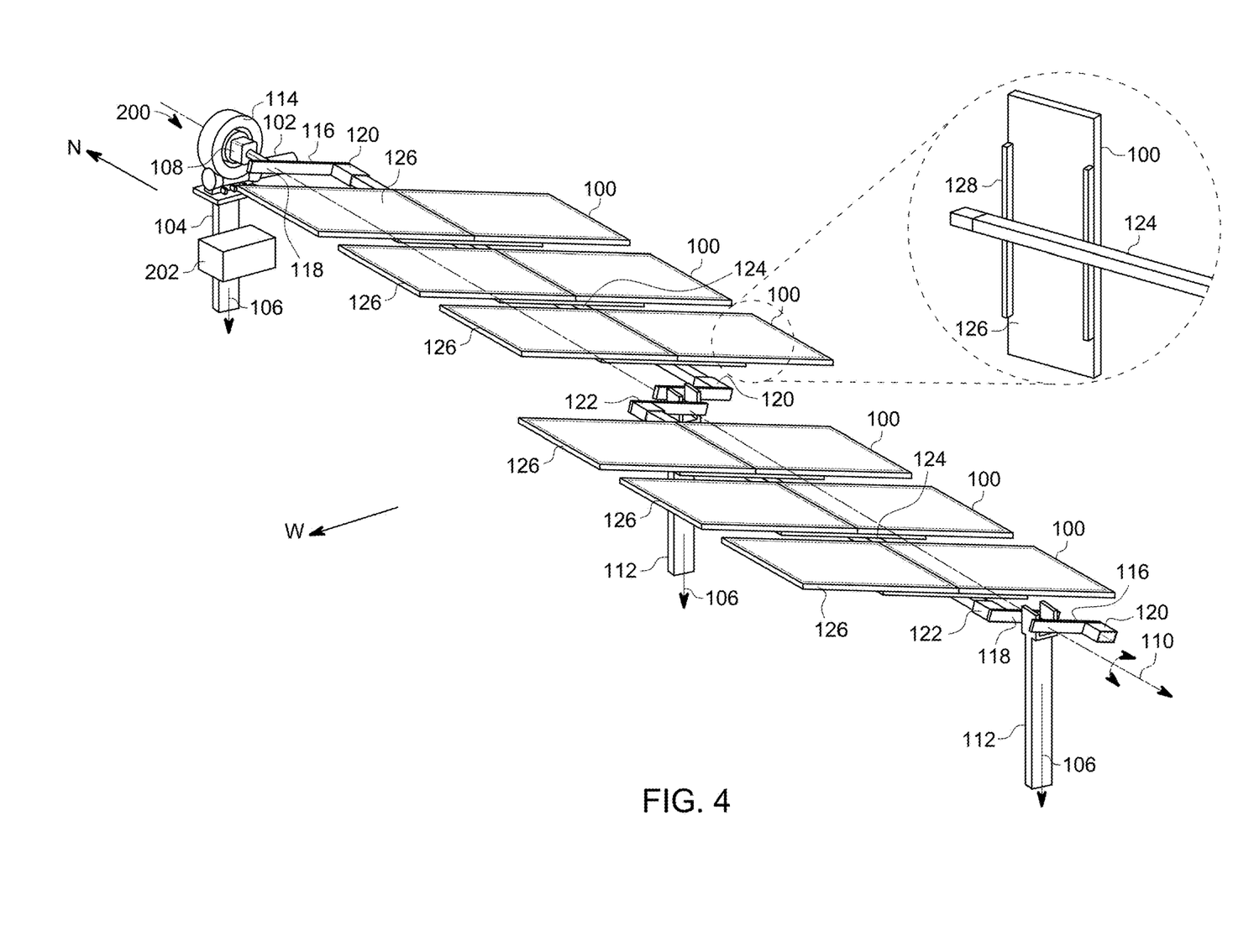
FIG. 4 is a perspective view of one embodiment of an improved single-axis photovoltaic tracker in an initial "sunrise" configuration.

FIG. 4 illustrates a perspective view of the assembled FIG. 3 of an improved single-axis photovoltaic tracking system in a sunrise configuration as it is configured in accordance with one or more embodiments of the invention. In this illustrated example, the system comprises of a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), and a fixed mounting bar (124).

In the sunrise configuration, the photovoltaic panels (100) and complimentary photovoltaic panels (126) are oriented to ensure an improved incident angle with respect to sunlight originating from a sunrise in the east. The photovoltaic panels (100) are shown as rotatably lowering below a plane perpendicular to the ground that extends through the central longitudinal axis (110). The photovoltaic panels (100) would thus be rotatably above the same plane, thus offsetting the lateral loads of the photovoltaic panels (100).

Figure 5:
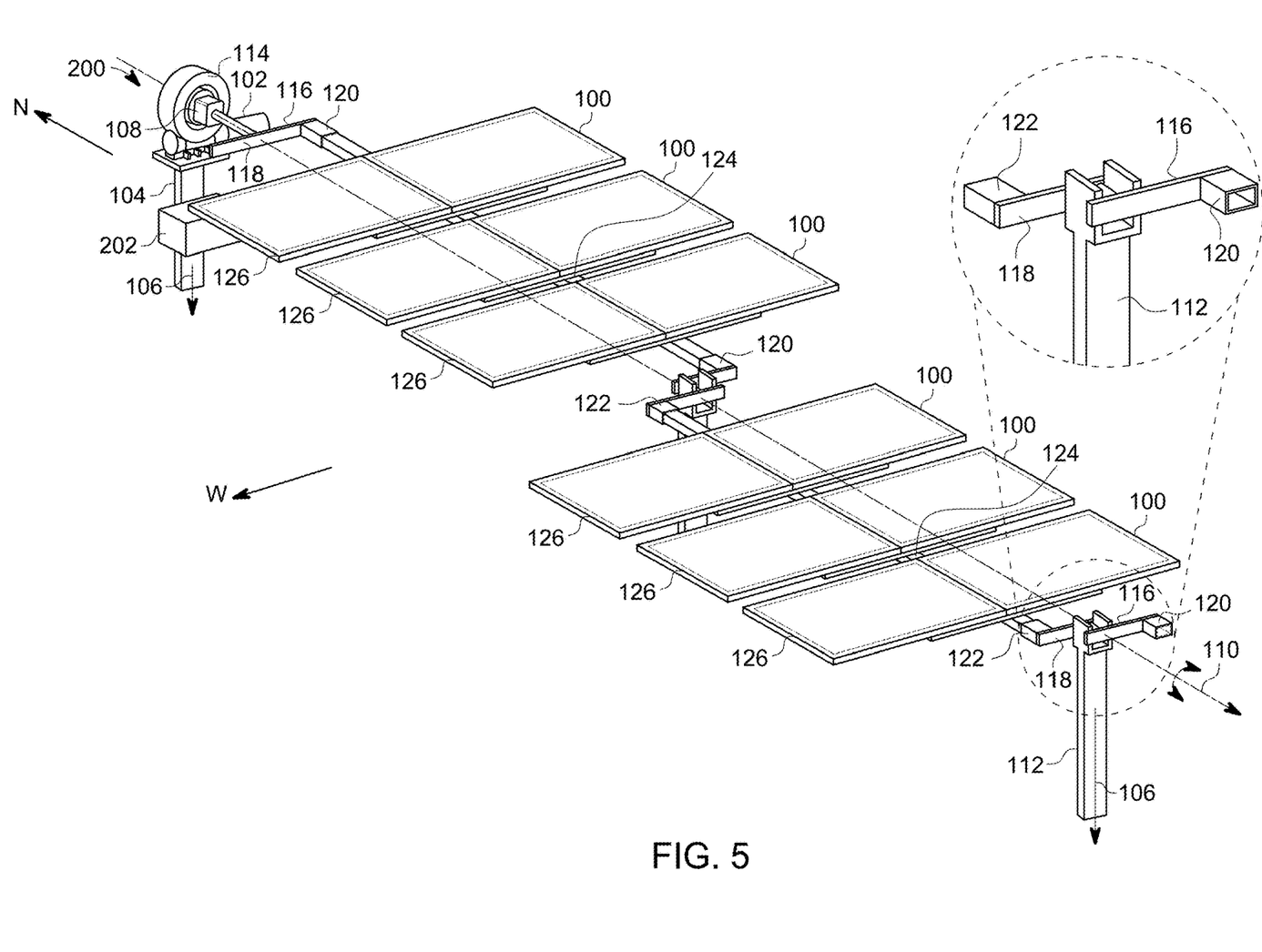
FIG. 5 is a perspective view of one embodiment of an improved single-axis photovoltaic tracker in a subsequent "morning" configuration.

FIG. 5 illustrates a perspective view of the assembled FIG. 3 of an improved single-axis photovoltaic tracking system in a morning configuration as it is configured in accordance with one or more embodiments of the invention. In this illustrated example, the system comprises of a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), and a fixed mounting bar (124).

In a morning configuration where the sun's light would be originating from a point higher in the sky above the horizon, thus necessitating a rotation of the photovoltaic panels (100) maintain an incidence angle to capture the light and thus generate a current. As described in, the photovoltaic panels (100) would offset the lateral forces imparted by photovoltaic panel (100) and the fixed mounting bar (124), as both would extend in a fixed plane laterally and equidistantly from the central longitudinal axis point (110) via a first mounting arm (116), second mounting arm (118), first main journal arm (120), and second main journal arm (122).

Figure 6:
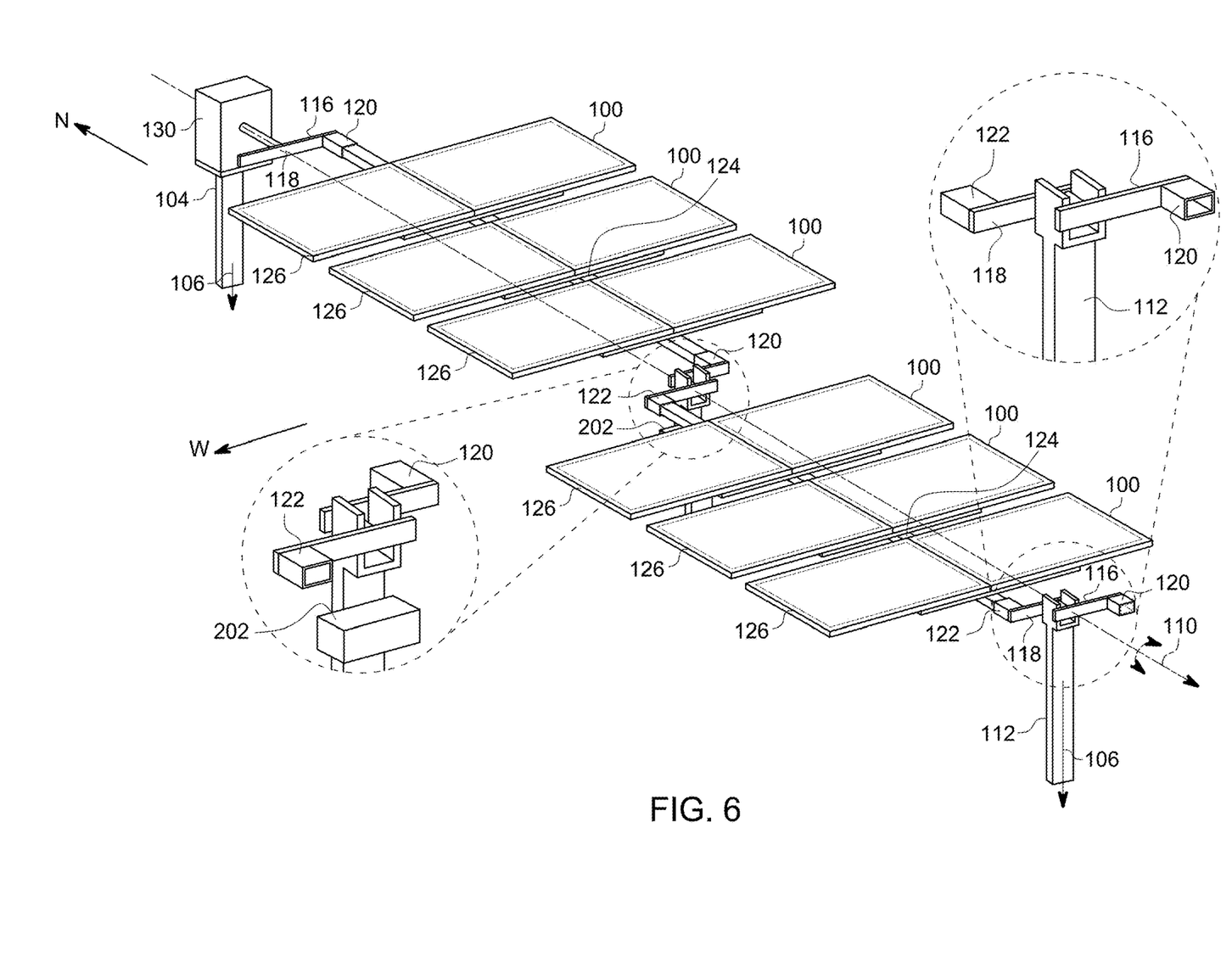
FIG. 6 is a perspective view of one embodiment of an improved single-axis photovoltaic tracker in a subsequent "noon" configuration.

FIG. 6 illustrates a perspective view of the assembled FIG. 1 of an improved single-axis photovoltaic tracking system in a midday configuration as it is configured in accordance with one or more embodiments of the invention. In this illustrated example, the system comprises of a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), and a fixed mounting bar (124).

In a midday or noon configuration where the sun's position creates an incident angle optimization position in which the photovoltaic panel (100) orientation matches, a lateral plane perpendicular to the ground. In this configuration, lateral counterbalancing of the photovoltaic panels (100) are directly opposing and thus allow for greater control and stability against wind or any other vibration that are external to the single-axis photovoltaic tracking system. As discussed in, counterbalancing is achieved by placing complimentary photovoltaic panels (126) and the complimentary mounting bars (128) on the eastern and western side of the single-axis system.

Figure 7:
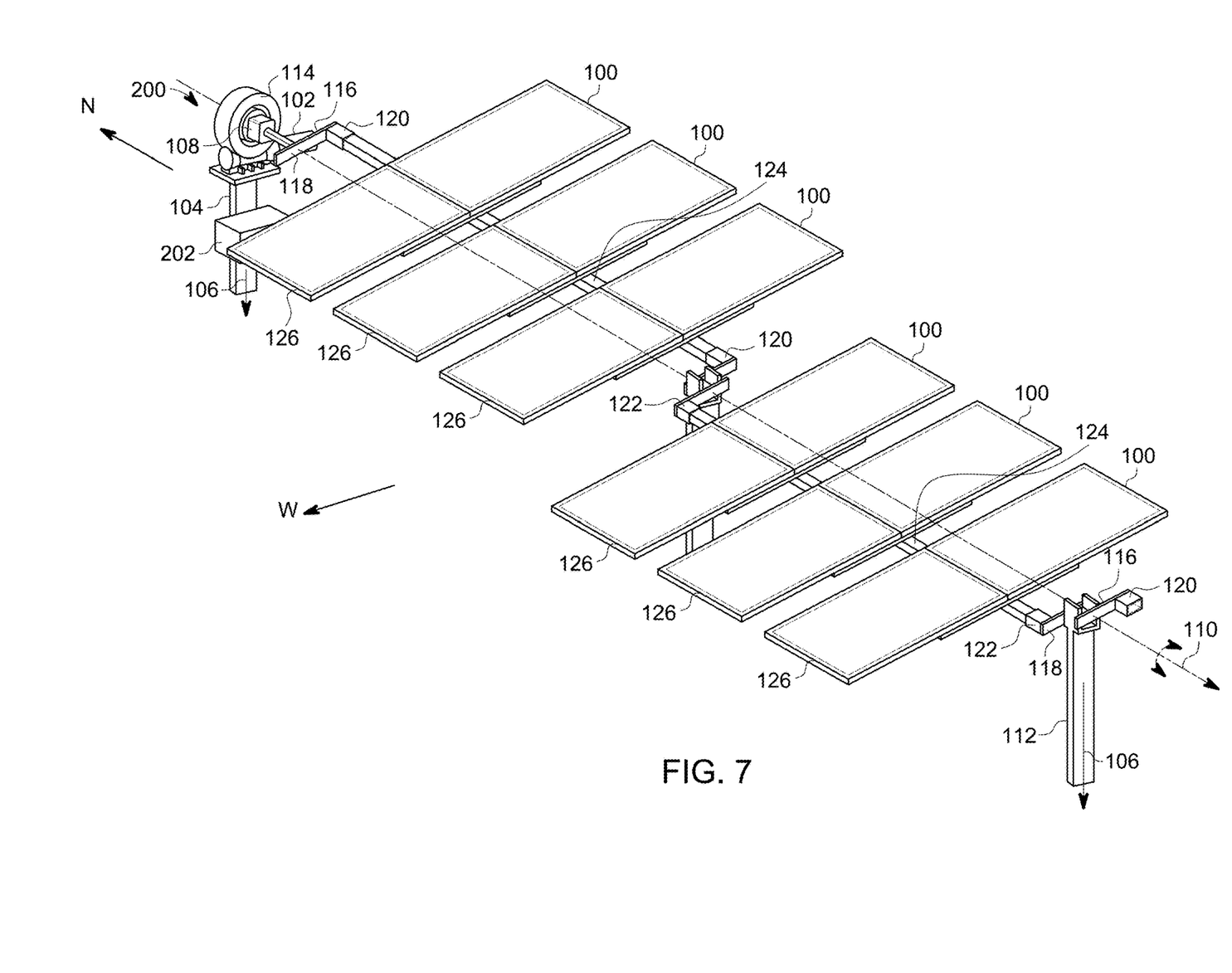
FIG. 7 is a perspective view of one embodiment of an improved single axis photovoltaic tracker in a "sunset" configuration.

FIG. 7 illustrates a perspective view of the assembled FIG. 3 of an improved single-axis photovoltaic tracking system in an evening configuration as it is configured in accordance with one or more embodiments of the invention. In this illustrated example, the system comprises of a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), and a fixed mounting bar (124).

In the evening or sunset positions, respectively, which are the end-of-day comparative analogues to the positions shown and described in Figures above.

Figure 8:
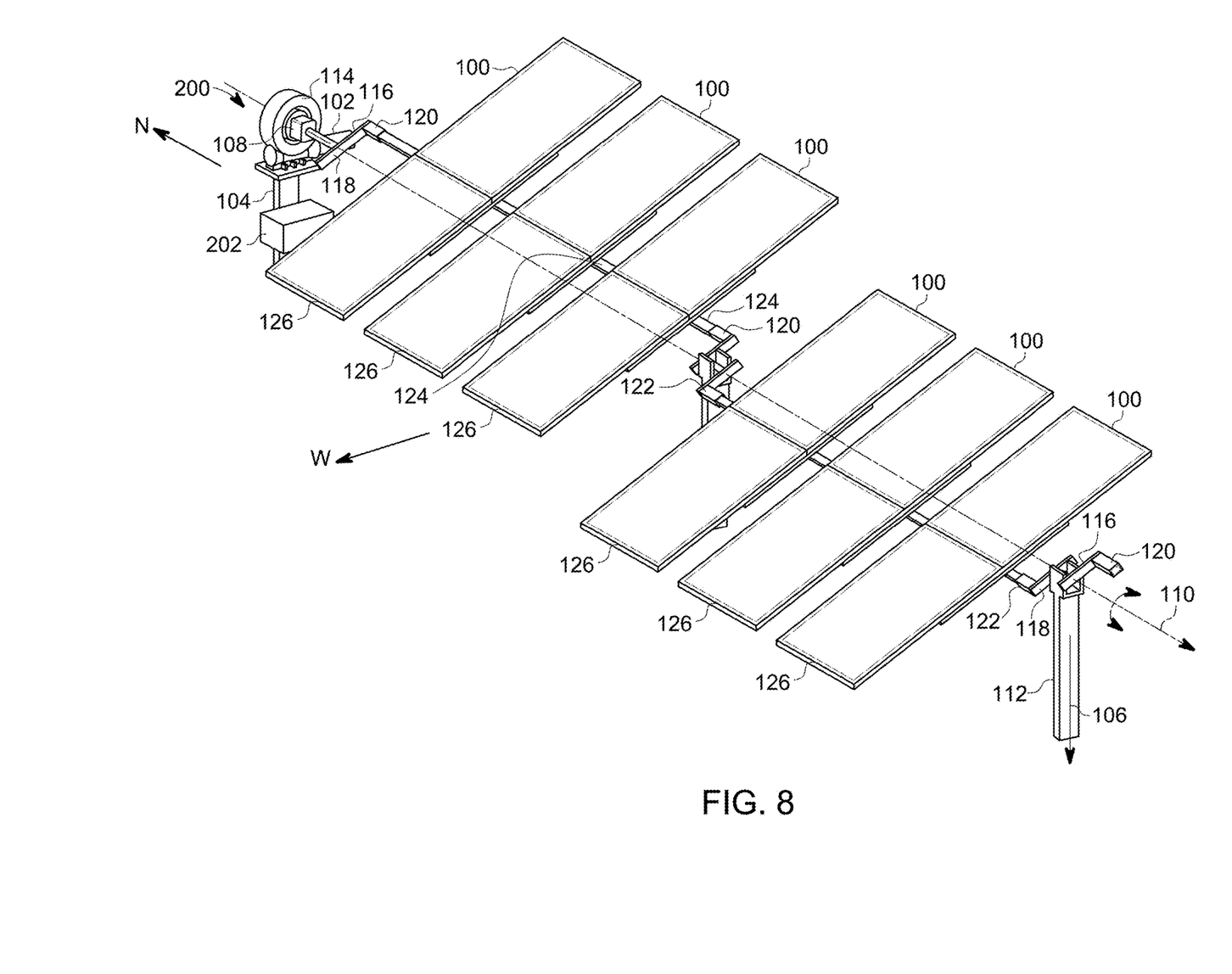
FIG. 8 is a perspective view of one embodiment of an improved single-axis photovoltaic tracker in a safety storage configuration.

FIG. 8 illustrates a perspective view of the assembled FIG. 3 of a single-axis photovoltaic tracking system in a stable nighttime or storage position, which is analogous to the orientation shown in figures above as it is configured in accordance with one or more embodiments of the invention. In this illustrated example, the system comprises a plurality of photovoltaic panels (100), a vertical motor support pier (104), a central axis (106), a central longitudinal axis (110), a vertical support pier (112), a first mounting arm (116), a second mounting arm (118), a first main journal arm (120), a second main journal arm (122), and a fixed mounting bar (124).

Figure 9:
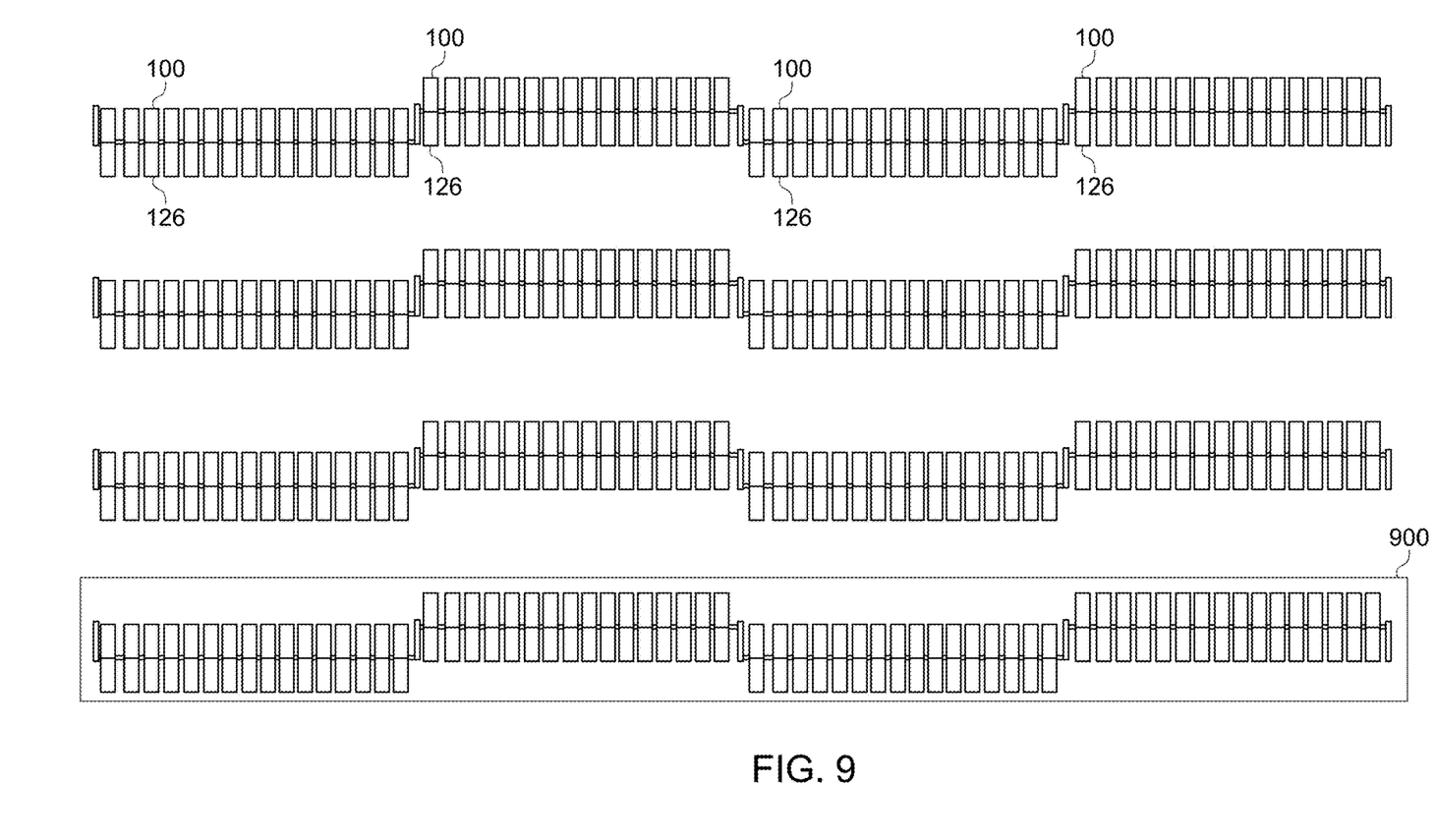
FIG. 9. is a top view of one embodiment of an improved single axis photovoltaic tracker in a "portrait" configuration.

FIG. 9 illustrates an improved single-axis photovoltaic tracking system that allows for the mounting of a larger number of complimentary photovoltaic panels (126) and photovoltaic panels (100) per row (900) thus resulting in longer rows which can alternatively allow for complimentary photovoltaic panel (126) mounting in a "portrait" mounting configuration. Further the counterbalanced central axis (106) rotating assembly allows for a flexible number of photovoltaic panels (100) per improved single-axis photovoltaic tracking system row (900). Thus, the cost of the improved single-axis photovoltaic tracking system is much less when compared to current systems of comparable row size, therefore allowing for the installation of larger systems at the same cost. In addition, the placement of complimentary photovoltaic panels (126) on both easternly and western side of single-axis photovoltaic tracking system allow the system to have counterbalancing of the photovoltaic panels (100). Counterbalancing allows for greater control and stability against external forces such as wind that are external to the single-axis photovoltaic tracking system.

Figure 10:
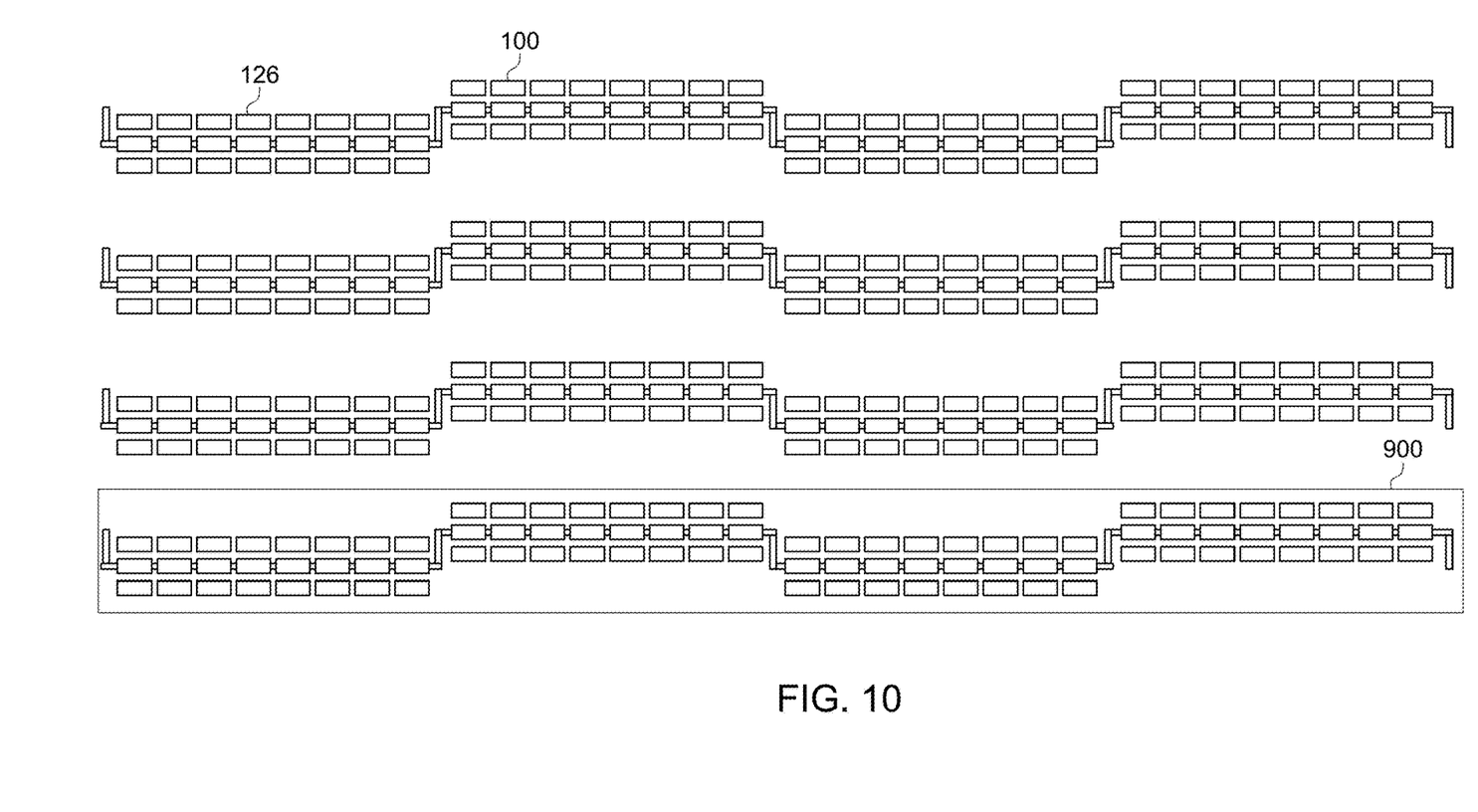
FIG. 10. is a top view of one embodiment of an improved single axis photovoltaic tracker in a "landscape" mode.

FIG. 10 illustrates an improved single-axis photovoltaic tracking system allows for the mounting of a larger number of complimentary photovoltaic panels (126) and photovoltaic panels (100) per row thus resulting in longer rows and can alternatively allow for complimentary photovoltaic panel (126) mounting in a "landscape" mounting configuration. Further the counterbalanced central axis (106) rotating assembly allows for a flexible number of photovoltaic panels (100) and complimentary photovoltaic panels (126) per improved single-axis photovoltaic tracking system row (900). This results in a reduction of motors (102) and omission of harnesses. Thus, the overall cost of the improved single-axis photovoltaic tracking system is much less when compared to current systems of comparable row size, therefore allowing for the installation of larger systems at the same cost.

What is claimed is:

1. A single-axis photovoltaic tracking system comprising:
a plurality of photovoltaic panels;
a central axis;
a central longitudinal axis;
a controller, wherein said controller rotates said plurality of photovoltaic panels about said central longitudinal axis;
a vertical support pier;
a vertical motor support pier, wherein said vertical motor support pier anchors said controller, wherein said central axis is an axis along said vertical support pier and said vertical motor support pier;
a first mounting arm, wherein said first mounting arm extends outward from said vertical support pier;
a second mounting arm, wherein said second mounting arm is configured directly opposed to said first mounting arm, wherein said second mounting arm extends outward from said vertical support pier, wherein said first mounting arm is connected to said second mounting arm;
said first mounting arm and said second mounting arm rotate on said vertical support pier along said central axis;
a first main journal arm, wherein said first main journal arm is attached to said first mounting arm;
a second main journal arm, wherein said second main journal arm is configured as directly opposed to said first main journal arm, wherein second main journal arm is attached to said second mounting arm;
a fixed mounting bar, wherein said fixed mounting bar is connected to said first main journal arm and said second main journal arm in an alternating manner, wherein said fixed mounting bar secures mounting of said plurality of photovoltaic panel, wherein said central longitudinal axis is a point of rotation for said plurality of photovoltaic panels and wherein the fixed mounting bar is offset from the central axis; and
a plurality of complementary photovoltaic panels, wherein in said plurality of complementary photovoltaic panels are attached to said plurality of photovoltaic panels via said fixed mounting bar and complementary mounting bars, wherein said plurality of photovoltaic panels are configured to be offset from said plurality of complimentary photovoltaic panels.

2. The single-axis photovoltaic tracking system of claim 1, wherein said complementary mounting bars extend from said fixed mounting bar.

3. The photovoltaic tracking system of claim 1, wherein said offset between plurality of photovoltaic panels and said plurality of complementary photovoltaic panels serves to counterbalance the weight of said plurality of photovoltaic panels and said complementary mounting bars along said central longitudinal axis.

4. The photovoltaic tracking system of claim 3, wherein said counterbalancing of said weight of said photovoltaic panels and said plurality complementary photovoltaic panels and said complementary mounting bars on said eastern side of said central longitudinal axis enables said central longitudinal axis to increase in length, wherein said increased length of said central longitudinal axis enables the use of more said plurality of photovoltaic panels.

5. A single-axis photovoltaic tracking system comprising:
a plurality of photovoltaic panels;
a central axis;
a central longitudinal axis;
an actuator, wherein said actuator rotates said plurality of photovoltaic panels about said central longitudinal axis;
a programmable logic controller, wherein said programmable logic controller controls rotations of said actuator;
a vertical support pier;
a vertical motor support pier, wherein said vertical motor support pier anchors said actuator, wherein said central axis is an axis along said vertical support pier and said vertical support pier;
a first mounting arm, wherein said first mounting arm extends outward from said vertical support pier;
a second mounting arm, wherein said second mounting arm is configured directly opposed to said first mounting arm, wherein said second mounting arm extends outward from said vertical support pier, wherein said first mounting arm is connected to said second mounting arm;
said first mounting arm and said second mounting arm rotate on said vertical support pier along said central axis;
a first main journal arm, wherein said first main journal arm is attached to said first mounting arm;
a second main journal arm, wherein said second main journal arm is configured as directly opposed to said first main journal arm, wherein second main journal arm is attached to said second mounting arm;
a fixed mounting bar, wherein said fixed mounting bar is connected to said first main journal arm and said second main journal arm in an alternating manner, wherein said fixed mounting bar secures mounting of said plurality of photovoltaic panel, wherein said central longitudinal axis is a point of rotation for said plurality of photovoltaic panels and wherein the fixed mounting bar is offset from the central axis; and
a plurality of complementary photovoltaic panels, wherein in said plurality of complementary photovoltaic panels are attached to said plurality of photovoltaic panels via said fixed mounting bar and complementary mounting bars, wherein said plurality of photovoltaic panels are configured to be offset from said plurality of complimentary photovoltaic panels.

6. The photovoltaic tracking system of claim 5, wherein said plurality of complementary mounting bars extend from said fixed mounting bar.

7. The photovoltaic tracking system of claim 5, wherein said offset between plurality of photovoltaic panels and said plurality of complementary photovoltaic panels serves to counterbalance the weight of said plurality of photovoltaic panels and said plurality of complementary mounting bars along said central longitudinal axis.

8. The photovoltaic tracking system of claim 7, wherein said counterbalancing of said weight of said plurality of photovoltaic panels and said plurality complementary photovoltaic panels and said complementary mounting bars on said eastern side of said fixed mounting bar enables said fixed mounting bar to increase in length, wherein said increased length of said fixed mounting bar enables the use of more said plurality of photovoltaic panels.

9. A single-axis photovoltaic tracking system comprising:
- a plurality of photovoltaic panels, wherein number of said photovoltaic panels can vary;
- a central axis;
- a central longitudinal axis;
- an actuator, wherein said actuator rotates said photovoltaic panels about said central longitudinal axis, wherein said central longitudinal axis runs along a fixed mounting bar, wherein said actuator further comprises:
- a stepper slew motor, wherein said stepper slew motor enables rotation of said photovoltaic panels by rotating said photovoltaic panels about said central longitudinal axis;
- a programmable logic controller, wherein said programmable logic controller controls rotations of said stepper slew motor; and
- a rotating main journal, wherein said rotating main journal is attached to said stepper slew motor, wherein said rotating main journal is configured to connect said stepper slew motor to said first mounting arm; wherein said rotating main journal is configured to connect said stepper slew motor to said second mounting arm;
- a vertical support pier;
- a vertical motor support pier, wherein said vertical motor support pier anchors said actuator, wherein said central axis-is an axis along said vertical support pier and said vertical motor support pier;
- a first mounting arm, wherein said first mounting arm extends outward from said vertical support pier;
- a second mounting arm, wherein said second mounting arm is configured directly opposed to said first mounting arm, wherein said second mounting arm extends outward from said, wherein said first mounting arm is connected to said second mounting arm;
- said first mounting arm and said second mounting arm rotate on said vertical support pier along said central axis;
- a first main journal arm, wherein said first main journal arm is attached to said first mounting arm;
- a second main journal arm, wherein said second main journal arm is configured as directly opposed to said first main journal arm, wherein second main journal arm is attached to said second mounting arm;
- a fixed mounting bar, wherein said fixed mounting bar is connected to said first main journal arm and said second main journal arm in an alternating manner, wherein said fixed mounting bar secures mounting of said plurality of photovoltaic panel; wherein said central longitudinal axis is a point of rotation for said plurality of photovoltaic panels and wherein the fixed mounting bar is offset from the central axis; and
- a plurality of complementary photovoltaic panels, wherein in said plurality of complementary photovoltaic panels are attached to said plurality of photovoltaic panels via said fixed mounting bar and complementary mounting bars, wherein said plurality of photovoltaic panels are configured to be offset from said plurality of complimentary photovoltaic panels.

10. The photovoltaic tracking system of claim 9, wherein said offset between said plurality of photovoltaic panels and said plurality of complementary photovoltaic panels serves to counterbalance the weight of said plurality of photovoltaic panels and said plurality of complementary mounting bars, along said central longitudinal axis.

11. The photovoltaic tracking system of claim 10, wherein said counterbalancing of said weight of said plurality of photovoltaic panels and said plurality complementary photovoltaic panels and said complementary mounting bars on said eastern side of said fixed mounting bar enables said fixed mounting bar to increase in length, wherein said increased length of said fixed mounting bar enables the use of additional said plurality of photovoltaic panels.

* * * * *